United States Patent Office 3,556,648
Patented Jan. 19, 1971

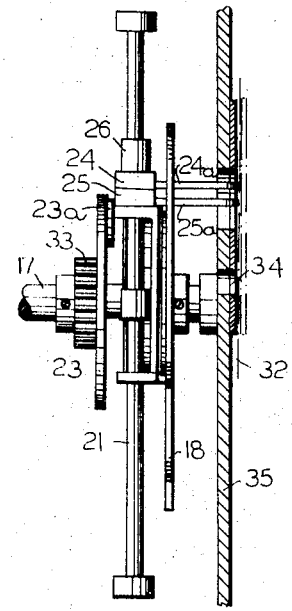
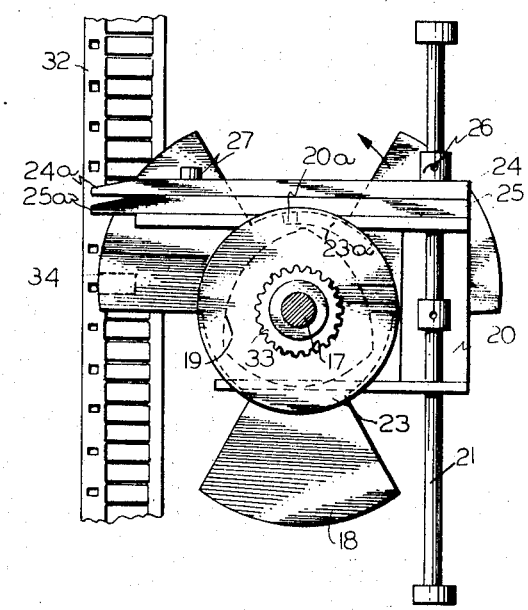
FIG. 5  FIG. 6
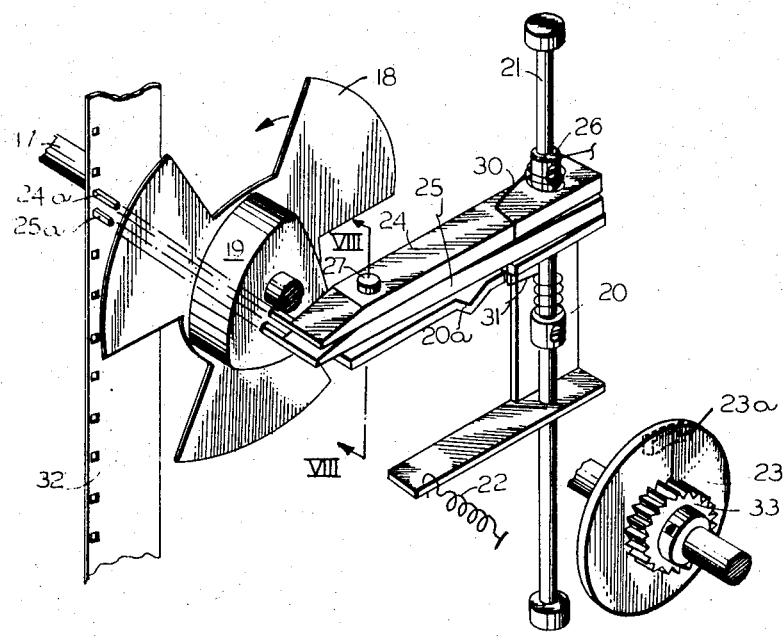
FIG. 7

3,556,648
FILM FEED DEVICE FOR MOTION-PICTURE APPARATUS
Yoshikuni Nozawa, Suwa, Japan, assignor to Sankyo Kogaku Kogyo Kabushiki Kaisha, Suwa, Japan
Filed Aug. 15, 1968, Ser. No. 752,834
Claims priority, application Japan, Aug. 17, 1967, 42/52,902; May 9, 1968, 43/31,143
Int. Cl. G03b 1/22
U.S. Cl. 352—194                    3 Claims

ABSTRACT OF THE DISCLOSURE

Feed device for intermittently feeding cinefilm at intervals corresponding to half a standard frame. Two pulldown claws are connected to two forks at the ends of their upper legs such that they are spaced in the direction of the film track from each other by a distance equal to a half the perforation pitch and face the series of film perforations. The forks are slidably and rotatably engaged at the ends of their lower legs on diametrically opposite portions of a face cam mounted on a rotary shaft parallel to a shutter shaft on which an eccentric cam is secured. The face cam is rotated at a speed equal to half the speed of rotation of the eccentric cam and for each complete revolution of the shutter shaft, both claws effect one simultaneous reciprocating movement in the direction of the film movement by one of the forks which is engaged with the eccentric cam, while they alternately enter the film perforations by the action of the face cam to move the cinefilm.

Alternatively both cams may be mounted on the shutter shaft and a cam follower slidably and rotatably engaged with the eccentric cam. Two pulldown claws are movably mounted on the follower and are resiliently urged into the film plane. A projection on the follower contacts the face cam.

---

This invention relates to a film feed device for use in a motion-picture camera or projector capable of intermittently feeding a length of cinefilm one after another at intervals corresponding to half a standard frame.

According to the invention, there is provided a film feed device of the type as above described comprising at least one feed claw for intermittently feeding a length of cinefilm having a predetermined pitch of the perforations, and an eccentric cam operatively with respect to the plane of the cinefilm. The device has two feed claws disposed one above the other in the direction in which the perforations are aligned with one another along one side of the cinefilm and are spaced from each other a distance corresponding to half the predetermined pitch of the perforations. The eccentric cam means are rotatable at a predetermined rate with respect to the rotation of the shutter shaft to effect reciprocating movement of the feed claw with a stroke corresponding to the predetermined pitch of the perforations in the direction of cinefilm feed. Face cam means are provided which are rotatable at a predetermined rate with respect to rotation of the shutter shaft to move the feed claws into and out of the perforations. The pair of feed claws alternately act to pull down the cinefilm a distance corresponding to a half the predetermined pitch of the perforations for each complete revolution of the shutter shaft.

In a preferred embodiment of the invention the eccentric cam means may be mounted on the shutter shaft while the face cam means are mounted on a rotary shaft interlocking with the shutter shaft with the eccentric cam means rotatable at a speed equal to twice the speed of rotation of the face cam means. A pair of holding members are supported on a common stationary shaft for both sliding movement along the common shaft and rotational movement about the axis thereof, and have extending from one end claw carrying arms for carrying the feed claws respectively and have extending from the other ends additional arms having free ends abutting in diametrically opposite relationship against the operating surface of the face cam means under pressure. One of the holding members engages the eccentric cam to act as a cam follower and spring means are operatively coupled to both the holding members to provide an allowance for each of their relative positions in the direction of sliding.

Advantageously both cam means may be mounted on the shutter shaft in order to make the resulting motion-picture camera or projector smaller. A cam follower engaging the eccentric cam means is supported on a stationary shaft disposed substantially perpendicularly to the shutter shaft for both reciprocating movement along the stationary shaft and rotational movement about the axis thereof and is provided with a projection resiliently abutting against the face cam means under pressure. A pair of arms carrying the feed claws are secured on the stationary shaft for rocking movement about the axis thereof and a pin planted on the cam follower loosely extends through the claw carrying arms with the feed claws tending to be moved toward the series of perforations on the cinefilm by means of spring means.

Accordingly the invention accomplishes the following objects:

(1) Cinefilms can be economically used because one uses a predetermined length of cinefilm for twice the period of time previously available while each film frame decreases in height to a half the conventional frame.

(2) A Cinerama- (trademark) like frame is obtained. Also a suitable cylindrical lens may be used to photograph objects so as to decrease their longitudinal dimension to a half while a cylindrical lens similar to that used upon photographing is utilized to project pictures so as to increase their longitudinal dimension by a factor of two resulting in the pictures having an ordinary length-to-width ratio.

(3) The apparatus can be designed to be compact and small-sized because the distance of film movement decreases to a half.

This invention will become more readily apparent from the following detailed description taken in conjunction with the accompanying drawings in which:

FIG. 5 is a side elevational view of another device constructed in accordance with the invention;

FIG. 6 is a front plan view of the device shown in FIG. 5;

FIG. 7 is an exploded perspective view of the device shown in FIGS. 5 and 6.

While the invention is applicable to a wide variety of motion-picture cameras and projectors it will now be described in terms of a sub-standard motion-picture camera using an 8 mm. wide cinefilm.

Figure 1:
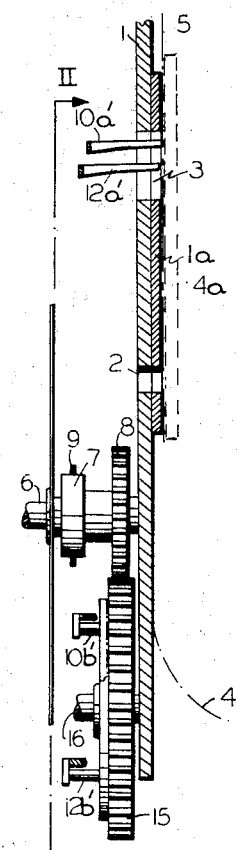
FIG. 1 is a fragmental side elevational view, partly in longitudinal sectional of a film feed device constructed in accordance with the invention.
Figure 2:
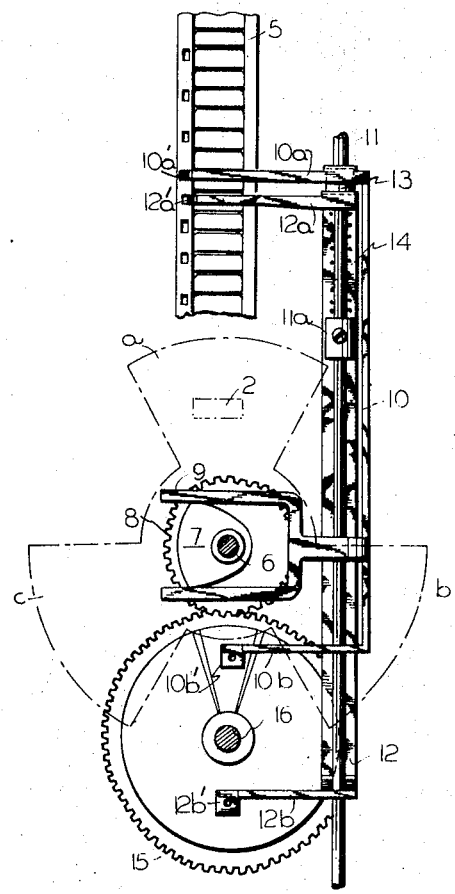
FIG. 2 is a front plan view of the device as viewed in the direction of the arrows on the line II—II of FIG. 1.

Referring now to the drawings and FIGS. 1 and 2 in particular, there is illustrated the essential parts of a film feed device for use in an 8 mm. width motion-picture camera constructed in accordance with the invention. The arrangement illustrated comprises a partition 1 disposed in front of a camera main body (not shown) and provided with both a film aperture 2 and a slot 3 separated from each other. A film track plate 1a is integrally attached to the rear surface or the right-hand surface as viewed in FIG. 1 of the partition 1 and is adapted to be fitted into a depression formed in a front surface of a film magazine loaded in the camera main body with one portion of the profile of the magazine designated the dot-and-dash line 4 in FIG. 1. A length of 8 mm. wide cinefilm 5 charged in the film magazine 4 is adapted to be intermittently fed past the film aperture 2 in the downward direction as viewed in FIG. 1 by means of a pair of feed claws as will be described hereinafter while passing between the film track plate 1a and a pressure plate disposed in the film magazine 4. The pressure plate is designated by phantom line 4a.

Rotatably disposed in front of the partition 1 and directly below the film aperture 2 as viewed in FIG. 1 is a shutter shaft 6 having rigidly secured thereon a shutter including for example three sectors a, b and c extending through angles of approximately 60 degrees and disposed at substantially equal angular intervals. The shaft 6 projects perpendicularly from the partition 1 and further has an eccentric cam 7 and a pinion 8 secured in spaced relationship thereon. The eccentric cam 7 may be of the conventional construction and in this example is in the form of a round triangle having three circularly arcuate sides and rigidly mounted at a point near to one of its verticies on the shaft 6. The cam 7 is engaged by a cam follower 9 in the form of a fork disposed in a direction substantially perpendicular to the direction of film movement by having its operating peripheral edge sandwiched between a pair of forked legs of the follower 9.

Figure 3:
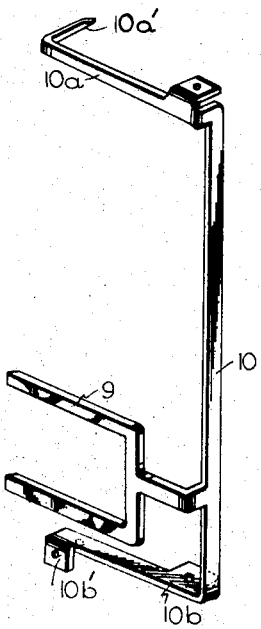
FIGS. 3 and 4 are perspective views of a pair of feed claw units constructed in accordance with the invention.

As best shown in FIG. 3, the forked follower 9 is connected on the shank portion to a U-shaped feed claw unit generally designated by the reference numeral 10. More specifically the shank portion of the fork 9 is integrally connected at right angles to the bottom of the U or the longitudinal rod portion of the unit 10 which has, in turn, a pair of upper and lower cross arms 10a and b extending in a parallel relationship substantially perpendicularly from both ends of the longitudinal rod portion. The upper cross arm, 10a has an ear laterally bent adjacent its connection with the longitudinal rod portion and a free end portion 10a′ similarly bent. The lower cross arm 10b has a similar ear vertically beneath the ear on the upper arm and a free end portion bent in the downward direction as viewed in FIG. 3. Both the ears have a pair of aligned holes for a purpose which will be apparent hereinafter and the free end portion of the lower arm 10b has a projection such as pin 10b′ substantially parallel to the free end portion 10a′ of the upper cross arm 10a. As shown in FIG. 2 a stationary longitudinal shaft 11 disposed substantially perpendicularly to the shutter shaft 6 loosely extends through the aligned holes in both ears of the upper and lower cross arms 10a and b permitting the feed claw unit 10 to slide along the shaft as well as to rotate around its axis. The longitudinal shaft 11 is suitably fixed to the camera main body. In its assembled position, the feed claw unit 10 has the upper free end portion 10a′ arranged to resiliently engage with that edge portion of a cinefilm involved in which the perforations are aligned with one another and constitutes a feed or pulldown claw for intermittently feeding the cinefilm.

Figure 4:
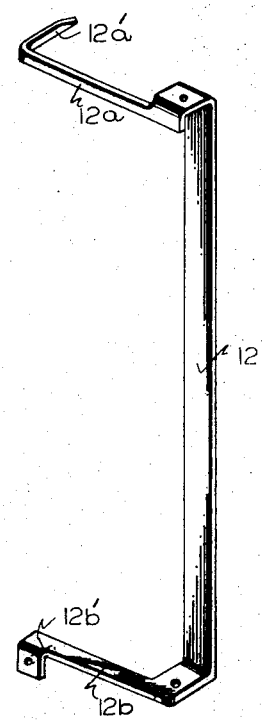

As shown in FIG. 2, the longitudinal shaft 11 carries another feed claw unit generally designated by the reference numeral 12 and is best shown in FIG. 4. The feed claw unit 12 is similar in construction to the first-mentioned feed claw unit 10 except that the forked follower 9 is omitted. Namely the unit 12 is in the form of a U and has a pair of upper and lower cross arms 12a and b including a feed claw 12a′ and a projection such as a pin 12b′ respectively identical to the corresponding components of the first feed claw unit 10. The longitudinal shaft 11 loosely extends through aligned holes formed in those portions of the upper and lower cross arms 12a and b adjacent their connection to the longitudinal rod portion of the unit 12. As in the feed claw unit 10, the free end portion 12a′ of the upper cross arm 12a serves as a second feed claw for intermittently feeding a cinefilm involved.

In order to maintain both feed claw units 10 and 12 and hence both feedclaws 10a′ and 12a′ spaced from each other in the direction of film feed by a predetermined length or a distance equal to a half the pitch of the film perforations determined in accordance with the standards of cinefilms, an annular spacer 13 of suitable axial length is loosely placed onto the longitudinal shaft 11 between the upper cross arms 10a and 12a respectively of both units with a helical spring 14 disposed around the shaft 11 between the lower side of the upper cross arm 12a of the second unit 12 and a collar or short sleeve 11a disposed at a level lower than that of the upper cross arm 12a and fixed on the shaft 11 by a screw.

On the other hand, the pinion 8 meshes mounted a gear 15 rotatably secured a transverse shaft 16 substantially parallel to the shutter shaft 6 mounted on the partition 1. The gear 15 has a tooth number equal to twice the tooth number of a pinion 8 for the purpose as will be apparent hereinafter. That face remote from the partition 1 or the front face of the gear 15 is in the form of a face cam having a single radial recess in the form of a sector disposed on its land portion as shown in FIG. 2. Any suitable spring (not shown) tends to urge the feed claws 10a′ or 12a′ and the pins 10b′ or 12b′ of each of the feed claw units 10 or 12 against the perforated edge portion of the cinefilm 5 and the said face cam on the gear 15 respectively with the pins 10b′ and 12b′ resiliently abutting in diametrically opposite relationship against the face cam under pressure and at substantially equal distances from the axis of the shaft 16.

Thus it will be appreciated that if either of the pins 10b′ or 12b′ engages the said land portion of the face cam that the associated feed claw 10a′ or 12a′ is retracted from the plane of the cinefilm 5. On the contrary if the pin 10b′ or 12b′ engages the recess of the face cam the associated feed claw can be fitted into a particular one of the film perforations having reached the same. In this connection it is to be noted that since the pins 10b′ and 12b′ are disposed on the opposite sides of the shaft 16 where they abut against the common face cam, the feed claws 10a′ and 12a′ are effectively prevented from simultaneously engaging or disengaging from any pair of adjacent perforations on the cinefilm.

In operation it is assumed that an electric motor (not shown) is rotated to drive the shutter shaft 6 and the shutter a–b–c thereon in the direction of the arrow shown or the counterclockwise direction as viewed in FIG. 2. This rotational movement of the shutter shaft 6 is accompanied by the rotational movement of the eccentric cam 7 and pinion 8 respectively. When the upper leg of the forked follower 9 engages that vertex remote from the axis of the shutter shaft 6 of the eccentric cam 7 the follower 9 is at its highest level to put the feed claw units and therefore the feed claws 10a′ and 10b′ into the upper limits of their stroke.

Then as the eccentric cam 7 is rotated in the counterclockwise direction through its position as illustrated in FIG. 2, the cam follower 9 is moved downwardly until it reaches its lowest position where its upper leg engages the vertex near the axis of the shutter shaft 6 of the eccentric cam 7 while the feed claws 10a′ and 12a′ are brought into the lower limits of their stroke. A further rotation of the eccentric cam 7 causes the feed claws to be moved upwardly through the cam follower until the upper leg of the cam follower again engages the first-mentioned vertex of the cam 7 where the feed claws are at their highest positions.

During the downward movement of the feed claws the cinefilms is pulled down by an amount corresponding to a half the pitch of the film perforations of the cinefilm 5 which will be described hereinafter. The shutter is arranged with respect to the eccentric cam such that for each complete revolution of the shutter shaft 6 any one of its sectors for example the sector a closes the film aperture 2 during the downward movement of the feed claws 10a' and 12a' after which a light from an object to be photographed (not shown) is permitted to pass through the film aperture 2 to the particular frame directly facing the latter of the cinefilm 5. The remaining two sectors b and c interrupt the light twice. This gives only a little effect upon motion-picture cameras but it is effective for preventing flickering of pictures projected by motion picture projectors.

It will now be described how the cinefilm is intermittently pulled down and fed by the feed claws 10a' and 12a' effecting the movements as previously described. Because the gear 15 has a tooth number equal to twice the tooth number of the pinion 8 the gear 15 the face cam integral therewith effects half a complete revolution for each complete revolution of the shutter shaft 6. It is now assumed that the upper feed claw 10a' has just engaged the particular one of the perforations on the cinefilm 5 due to the associated pin 10b' engaging the recess of the face cam while the lower feed claw 12a' is located at the middle point intermediate that perforation and the next perforation and separated from the plane of the cinefilm because the associated pin 12b' engages the land of the face cam. Under the assumed condition the rotational movement of the shutter 6 causes the upper feed claw 10a' to be downwardly moved to pull down the cinefilm 5 by a length equal to a half the above-mentioned perforation pitch. It is noted that during the pulldown movement of the cinefilm the shutter sector a continues to close the film aperture 2 thereby to prevent the pulled down film frame from being exposed to light. When the sector a has passed the aperture 2 the film frame now pulled down is exposed to light.

Then the upper pin 10b' begins to contact the land portion of the face cam to remove the associated feed claw 10a' from the perforation into which it has fitted up to this point whereby the feed claw is separated from the plane of the cinefilm. The upper feed claw 10a' along with the lower feed claw 12a' maintained separated from the plane of the cinefilm can now be moved upwardly with respect to the cinefilm through the rotation of the eccentric cam 7 by a distance equal to a half the perforation pitch until the lower feed claw 12a' coincides with the succeeding perforation while the upper feed claw is located at the middle point between that perforation and the adjacent one. However both claws are spaced away from the plane of the cinefilm. Thereafter the lower feed claw 12a' falls into that perforation facing the same by the action of the face cam and the associated pin 12b'. The lower claw as inserted into the perforation is similarly moved downwardly to pulldown the cinefilm by a length equal to a half the said perforation pitch followed by an exposure.

Then the lower feed claw is similarly separated from the perforation and together with the upper feed claw is upwardly moved with respect to the cinefilm by a distance equal to a half the pitch until the upper feed claw occupies its position directly above the succeeding perforation. Then the upper feed claw falls into that perforation by the action of the face cam and the associated pin whereupon the assumed original condition is reached. Then the process as above described is repeated to intermittently feed the cinefilm at intervals corresponding to half a standard frame.

It is well-known that the perforation pitch of a print cinefilm may have different magnitudes slightly deviated from its predetermined magnitude at different locations resulting from secular change, local shrinkage due to the developing treatment etc. The invention as applied to motion-picture projectors can satisfactorily feed such print cinefilms without any malfunction for the reason that the upper cross arms 10a and 12a are resiliently supported on the longitudinal shaft 11 by the helical spring 14 so as to be displaceable in the direction of film movement.

In the pulldown cycle, the pins 10b' and 12b' serving to flutter the associated claw arms under control of the face cam on the gear 15 each diametrically reciprocate along the face cam a distance corresponding to a half the perforation pitch. With an 8 mm. wide cinefilm, one-half the perforation pitch is a very small length so that the face cam is required only to have an operating annulus whose radial length is slightly larger than a half the perforation pitch. This permits such a face cam to be easily machined. It will be appreciated that the pin 10b' is moved toward and away from the plane of FIG. 2 under control of the common face cam in the same manner as is the pin 12b' excepting that their movements are in out of phase of 180°.

The upper cross arm or the claw holder 10a and 12a may be resilient so as to cause the extremities of the feed claws to always abut against the plane of the cinefilm under pressure while at the same time the extremity of each claw is formed into a hook. With this arrangement, either of the claws falling into the particular perforation will descend and simultaneously the cinefilm is pulled down. Upon the return or ascending movement of that claw its extremity may be automatically removed from the perforation to permit only the claw to ascend while it rubs the surface of the cinefilm. This can eliminate the necessity of providing the face cam and pins as previously described. However such a measure is disadvantageous in that scratches are not only developed on that marginal portion including a series of perforation of the cinefilm but also during the returning movement of each feed claw or when each feed claw is moving in the upward direction as viewed in FIG. 2, the cinefilm tends to be somewhat moved in the reverse direction resulting in the cinefilm halting in an unstable state there by to deteriorate the sharpness of the resulting record or picture. Therefore such a measure is not desirable.

Referring now to FIGS. 5 through 8, it is seen that the arrangement disclosed herein comprises a shutter shaft 17, a shutter 18 rigidly secured on the shaft and an eccentric cam 19 also rigidly mounted on the shaft. The shutter 18 may be similar to the shutter as previously described in conjunction with FIG. 2 and the cam 19 is in the form of a round equilateral triangle having three circularly arcuate sides equal in radius of curvature to each other and rigidly secured at the center on the shaft 17. The eccentric cam 19 has a U-shaped cam follower 20 always engaged thereby. Specifically the parallel legs of the U always engage the operating periphery of the eccentric cam 19. The cam follower 20 is movably secured on a stationary longitudinal shaft 21 similar to the longitudinal shaft 11 by having the shaft loosely extending through both legs of the U adjacent their connections with the bottom of the U. Thus the follower 20 is slidable along the shaft 21 and also rotatable about the axis of the shaft. One of the legs, in this example, the lower leg as viewed in FIG. 7 has a tension spring 22 anchored at one end to the free end portion thereof and has the other end suitably fixed on the camera main body (not shown). The tension spring 22 tends always to bias the cam follower 20 toward a face cam plate 23 of circular shape rigidly mounted at the center on the shutter shaft 17 and on that side remote from the shutter 18 of the follower 20. The face cam plate 23 is provided on one portion of the peripheral portion with an arcuate protrusion 23a adapted to intermittently abut against a thorn-shaped projection 20a disposed on the other leg, in this case, the upper leg of the U-shaped cam follower 20 during the rotational movement of the face cam plate 23.

Figure 8:
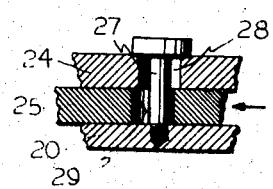
FIG. 8 is a fragmental sectional view taken along the line VIII—VIII of FIG. 7 with a part illustrated in elevation.

As best shown in FIG. 7, a pair of arm plates 24 and 25 are disposed in superposed relationship upon the upper leg of the cam follower 20 and journalled at one end on the longitudinal shaft 21 for both sliding movement along the shaft and rotational movement about the axis thereof. In order to prevent the pair of superposed arm plates 24 and 25 from moving away from the upper leg of the cam follower 20, a retaining ring 26 is secured on the longitudinal shaft 21 as by set screws so as to urge both plates against the upper follower leg. As best shown in FIG. 8, a screw threaded pin 27 with a head loosely extends through holes 28 and 29 in the superposed arm plates 24 and 25 adjacent their end portions remote from the shaft 21 with a suitable clearance formed between the same and each of the arm plates until it is screwed into the upper leg of the cam follower 20. Therefore it will be appreciated that the arm plates 24 and 25 are permitted to be rotated in either direction about the axis of the longitudinal shaft 21 and with respect to the upper leg of the cam follower 20 to an extent determined by each of the clearances between the pin 27 and the arm plates 24 and 25. In this connection it is noted that a pair of springs 30 and 31 as shown in FIG. 7 tend normally to rotate the arm plates 24 and 25 about the axis of the longitudinal shaft in the direction of the arrow denoted adjacent the arm plate 24 in FIG. 7. This results in a tendency to provide a maximum play between the inner peripheral surface of each hole 28 or 29 and the peripheral surface of the pin 27 threaded through each hole and on that side opposite to the face cam plate 23 of the pin.

As shown in FIGS. 5 through 7, both arm plates 24 and 25 have the respective feed claws 24a and 25a extending integrally from their free ends in parallel relationship with respect to each other and the axis of the shutter shaft 17 in a direction away from the face cam plate 23. As in the previous embodiment, the feed claws 24a and 25a are spacing vertically or in a direction parallel to the plane of a cinefilm 32 from each other by a distance equal to a half the perforation pitch of the cinefilm. This spacing between both feed claws may be accomplished by controlling the thicknesses of the arm plates 24 and 25. It will be appreciated that the springs 30 and 31 tend normally to cause the feed claws 24a and 25a to move toward the plane of the cinefilm under pressure.

However if either of the feed claws 24a or 25a abuts against a non-perforated portion of the cinefilm 32 the plane of the latter maintains that feed claw in contact with the same against the action of the spring 30 or 31 as the case may be whereby the hole on the associated arm plate, for example the hole 28 on the arm plate 24, encircles the pin 27 to form a clearance around the entire periphery of the pin as shown in FIG. 8. Alternatively if either of the feed claws coincides in relative position with one of the film perforations then that feed claw is permitted to enter that perforation by the action of the associated spring 30 and 31 whereby the hole in the associated arm plate, for example the hole 29 on the arm plate 25, encircles the screw 27 to form a maximum clearance on that side near to the cinefilm 32 of the pin.

It will be apparent that the position of the pin 27 itself around which the clearance is formed is movable forward and away from the plane of the cinefilm 32 through the movement of the cam follower 20 integral with the pin under control of the face cam plate 23 disposed on the shutter shaft 17. It is to be noted that the position of the arcuate protrusion on the face cam plate 23 should be so adjusted with respect to a selected one of the three verticies of the triangular cam 19 that the arcuate protrusion abuts against the thorn-shaped projection 20a on the follower 20 once for each complete revolution of the shutter shaft 17 thereby to rock the follower toward the cinefilm against the action of the tension spring 22.

In operation an electric motor suitably disposed in the camera main body (not illustrated) is rotated to drive the shutter shaft 17 in the counterclockwise direction as shown at the arrow in FIGS. 6 and 7 through a gear 33 mounted on the shaft 17. For each complete revolution of the shaft 17 the cam follower 20 effects three reciprocating movements in a direction parallel to the plane of the eccentric cam 19 having a stroke corresponding to a half the perforation pitch of the cinefilm. During only a selected one of three reciprocating movements the arcuate protrusion 23a on the face cam plate 23 abuts against the thorn-shaped projection 20a on the cam follower 20 to rock it toward the side of the cinefilm against the action of the springs 30 and 31 whereupon either one of the feed claws 24a or 25a enters the particular one of the film perforations facing it. Then the cam follower 20 descends a distance equal to a half the perforation pitch to pulldown the cinefilm the same distance. As in the previous embodiment, a selected one of the shutter sectors, for example the sector a, prevents the film frame pulled down from being exposed to light. Then after its removal from the perforation the feed claw is caused to ascend along with the other claw through the upward movement of the cam follower. The process as above described is repeated with the other feed claw. In this way both feed claws alternately engage the successive film perforation to pulldown the cinefilm by distance corresponding to keep a standard frame.

As in the embodiment shown in FIGS. 1 through 3, the pulling down of the cinefilm is accomplished for a period of time when one of the three shutter sectors closes a film aperture 34 formed in a partition 35 (see FIG. 5). The remaining two sectors interrupt the light passed through the film aperture 34 twice for each complete revolution of the shutter shaft 17 which produces the effect as previously described in conjunction with the embodiment as shown in FIGS. 1 through 4.

The arrangement as illustrated in FIGS. 5 through 8 can make it possible to design and construct the resulting camera or projector in a size which is small as compared with that shown in FIGS. 1 through 4 because the face cam plate 23 is mounted on the shutter shaft 17 to control the movement of the pulling down claws toward and away from the plane of the associated cinefilm.

While the invention has been described in conjunction with a few preferred embodiments thereof it is to be understood that various changes in the details of construction and the combination and arrangement of parts may be resorted to without departing from the spirit and scope of the invention defined in the appended claims.

What is claimed is:

1. In a film feed device for use in a motion-picture apparatus for intermittently feeding a length of cinefilm having a predetermined pitch of perforations at intervals corresponding to half a standard frame the combination of a rotary shutter shaft a pair of feed claws disposed one above the other in a direction in which the perforations are aligned with one another along one side of the cinefilm and spaced from each other by a distance corresponding to a half the predetermined pitch of the perforations, said feed claws being mounted in said combination for reciprocal movement in the direction of feed of the cinefilm and for individual pivotal movement toward and away from the film about an axis parallel to the feed direction, eccentric cam means operatively associated with said shutter shaft and rotatable at a predetermined rate with respect to rotation of said shutter shaft and coupled with said feed claws to effect reciprocating movement of said feed claws a distance corresponding to half the predetermined pitch of the perforations in the direction of cinefilm feed, face cam means operatively associated with said shutter shaft and rotatable at a predetermined rate with respect to rotation of said shutter shaft and engaged with said feed claws for pivoting first one feed claw and then the other feed claw toward the perforations, and means coupled with said feed claws resiliently biasing them away from the cinefilm, whereby the cinefilm is fed a length corresponding to a half the predetermined pitch of the perforations for each complete revolution of the shutter shaft.

2. The combination as claimed in claim 1 wherein said eccentric cam means is mounted on said shutter shaft and a separate rotatable shaft is provided on which said face cam means is mounted, said separate rotatable shaft being coupled with said shutter shaft for rotation at a speed equal to twice the speed of rotation of said shutter shaft and said face cam means, and further comprising a stationary shaft along said axis parallel to said feed direction, and a pair of holding members mounted on said stationary shaft for both sliding movement along said stationary shaft and rotational movement about the axis thereof and having extending from the one ends claw carrying arms for carrying said feed claws respectively and having extending from the other ends additional arms having free ends abutting in diametrically opposite relationship against the operating surface of said face cam means, one of said holding members engaging said eccentric cam means to act as a cam follower, and said resilient biasing means comprise spring means operatively coupled to both said holding members.

3. The combination as claimed in claim 1 wherein both said eccentric cam means and said face cam means are rigidly secured on said shutter shaft, and further comprising a stationary shaft disposed along said axis parallel to said feed direction and substantially perpendicular to said shutter shaft, a cam follower supported on said stationary shaft for both reciprocating movement along the stationary shaft and rotational movement about the axis thereof and engaged with said eccentric cam means and having a projection abutting against said face cam means, and a pair of arms carrying said feed claws and mounted on said stationary shaft for pivotal movement about the axis thereof, and a pin mounted on said cam follower loosely extending through said claw carrying arms, said resilient biasing means comprising spring means operatively coupled to said cam follower and said pair of arms.

References Cited

UNITED STATES PATENTS

| | | | |
|---|---|---|---|
| 2,136,930 | 11/1938 | Albrecht | 226—63 |
| 2,344,574 | 3/1944 | Victor | 352—194 |
| 2,712,771 | 7/1955 | Isom | 352—194 |

S. CLEMENT SWISHER, Primary Examiner

U.S. Cl. X.R.

226—63